(12) United States Patent
Shotey et al.

(10) Patent No.: US 7,554,037 B1
(45) Date of Patent: Jun. 30, 2009

(54) EXPANDABLE IN-USE OUTLET COVER

(75) Inventors: Marcus J. Shotey, Scottsdale, AZ (US);
Edgar W. Maltby, Mesa, AZ (US);
Jeffrey P. Baldwin, Phoenix, AZ (US);
Lincoln Jolley, West Jordan, UT (US);
Kenneth C. Booth, Mesa, AZ (US)

(73) Assignee: TayMac Corporation, Gilbert, AZ (US)

( * ) Notice: Subject to any disclaimer, the term of this patent is extended or adjusted under 35 U.S.C. 154(b) by 0 days.

(21) Appl. No.: 12/169,058

(22) Filed: Jul. 8, 2008

Related U.S. Application Data

(63) Continuation of application No. 11/422,583, filed on Jun. 6, 2006, now Pat. No. 7,396,996.

(51) Int. Cl.
*H05K 5/03* (2006.01)

(52) U.S. Cl. .......................... 174/67; 174/66; 174/481; 174/57; 220/3.2; 220/242; 220/241

(58) Field of Classification Search .................. 174/67, 174/53, 481, 480, 57, 58, 66, 559, 503; 220/3.2–3.9, 220/4.02, 241, 242; 248/906; 439/535, 536
See application file for complete search history.

(56) References Cited

U.S. PATENT DOCUMENTS

| | | | |
|---|---|---|---|
| 2,458,153 A | 1/1949 | Festge | |
| 2,916,733 A | 12/1959 | Hirsch | |
| 3,449,706 A | 6/1969 | Carissimi | |
| 4,634,015 A | 1/1987 | Taylor | |
| 4,803,307 A | 2/1989 | Shotey | |
| 4,988,832 A | 1/1991 | Shotey | |
| 5,042,673 A | 8/1991 | McShane | |
| 5,527,993 A | 6/1996 | Shotey et al. | |
| 5,562,222 A | 10/1996 | Jordan et al. | |
| 5,763,831 A | 6/1998 | Shotey et al. | |
| 5,931,325 A * | 8/1999 | Filipov | 174/57 |
| 6,133,531 A | 10/2000 | Hayduke et al. | |
| 6,441,307 B1 | 8/2002 | Shotey et al. | |
| 6,476,321 B1 | 11/2002 | Shotey et al. | |
| 6,723,922 B1 | 4/2004 | Shotey et al. | |
| 6,737,576 B1 | 5/2004 | Dinh | |
| 6,761,582 B1 | 7/2004 | Shotey et al. | |
| 6,770,816 B2 | 8/2004 | Shotey et al. | |
| 6,820,760 B2 * | 11/2004 | Wegner et al. | 174/57 |
| 6,894,223 B1 | 5/2005 | Shotey et al. | |
| 6,979,777 B2 | 12/2005 | Marcou et al. | |
| 6,987,225 B2 | 1/2006 | Shotey et al. | |
| 7,038,131 B1 | 5/2006 | Gretz | |
| 7,109,419 B1 | 9/2006 | Gretz | |
| 7,259,328 B1 | 8/2007 | Gretz | |
| 2005/0197019 A1 | 9/2005 | Shotey et al. | |

\* cited by examiner

*Primary Examiner*—Angel R Estrada
(74) *Attorney, Agent, or Firm*—Booth Udall, PLC

(57) ABSTRACT

A telescoping in-use cover plate that includes at least two inter-fitting members that enable the cover to be retracted to the wall when not in use and expanded to increase the depth of the outlet cover and allow a plug to be plugged into the outlet when the cover is closed. Specific implementations allow for vertical and horizontal mounting and installation, knockouts and/or adapter plates for conversion to alternate electrical configurations.

20 Claims, 13 Drawing Sheets

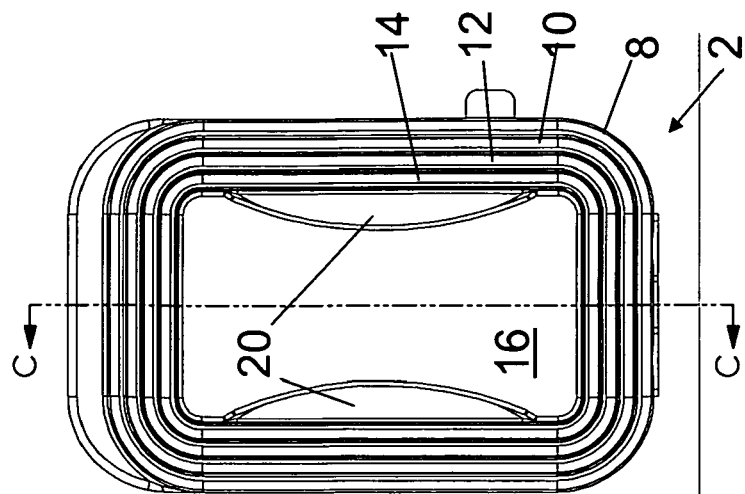
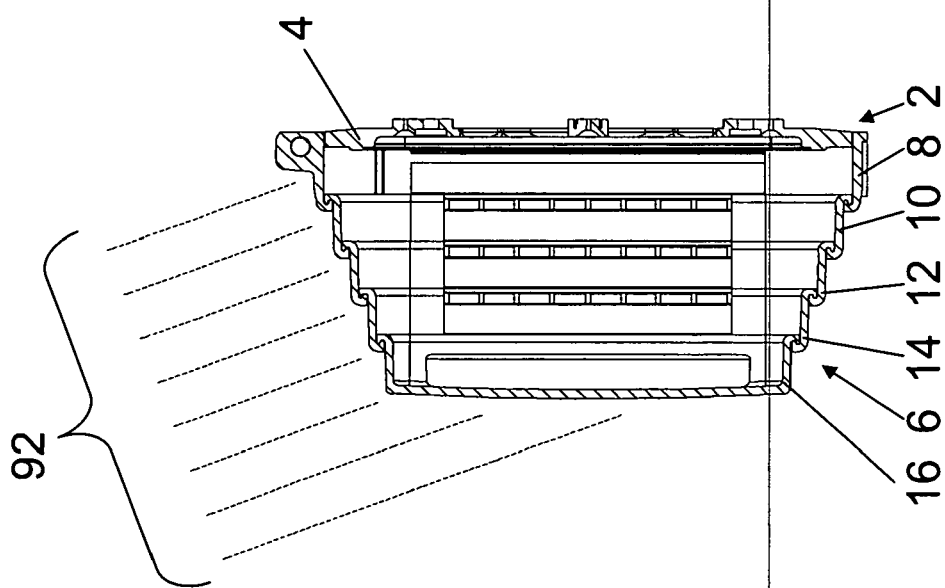

EXPANDABLE IN-USE OUTLET COVER

RELATED APPLICATIONS

This document is a continuation of U.S. patent application Ser. No. 11/422,583 which was filed on Jun. 6, 2006, the disclosure of which is hereby incorporated herein by reference.

BACKGROUND

1. Technical Field

Aspects of this document relate generally to expandable small electrical device covers, such as for use with electrical outlets and switches. More specific implementations involve covers that can be flattened while not in use and expanded to a depth sufficient to house a plug while the outlet is in use.

2. Background Art

In-use outlet covers are those outlet covers that are configured to allow an electrical plug to be plugged into the outlet while a protective cover is closed. Having the cover closed while being used allows the cover to protect the outlet from the elements, such as rain, moisture and dust.

Conventionally, to enable an electrical outlet cover to close while the outlet is in use, the base or lid of the cover unit needs to be adapted to be deep enough to allow for the lid to close without significant interference with the plug when the plug is inserted into the outlet. Some of the conventional approaches to accomplishing this deeper base are shown and described in U.S. Pat. No. 6,723,922 to Shotey et al. (Issued Apr. 20, 2004) titled "Universal cover plate", U.S. Pat. No. 6,133,531 to Hayduke (Issued Oct. 17, 2000) titled "Weatherproof outlet cover", U.S. Pat. No. 4,988,832 to Shotey et al. (Issued Jan. 29, 1991) titled "Recessed electrical outlet with cover", U.S. Pat. No. 4,803,307 to Shotey et al. (Issued Feb. 7, 1989) titled "Weatherproof outlet cover", the disclosures of each of which are hereby incorporated herein by reference for their general relevance to the formation and manufacture of cover assemblies.

Each of these designs involves a cover unit having a fixed dimension using what is typically called a bubble cover lid that bulges to allow room for the plug and cord within the cover when it is closed. One of the common complaints associated with conventional in-use cover designs is that the cover units protrude three or more inches from the exterior of the home, may be damaged or dislodged by passers-by, and are often unattractive on the home due to the size.

Horizontal and vertical mountable electrical device cover assemblies using hinges are known in the art. Some examples of these assemblies are shown and described in U.S. Pat. Nos. 5,763,831 to Shotey et al. (issued Jun. 9, 1998) titled "Universal Cover Plate, Cover Plate Assembly, and Related Methods," 6,133,531 to Hayduke et al. (issued Oct. 17, 2000) titled "Weatherproof Outlet Cover," 6,441,307 to Shotey et al. (issued Aug. 27, 2002) titled "Universal Cover Plate," 6,476,321 to Shotey et al. (issued Nov. 5, 2002) titled "Horizontal and Vertical Mountable Weatherproof Cover Plate," 6,979,777 to Marcou et al. (issued Dec. 27, 2005) titled "Weatherproof Electrical Enclosure Having an Adjustable-Position Cover," 6,894,223 to Shotey et al. (issued May 17, 2005) titled "Horizontal and vertical mountable weatherproof cover plate", and U.S. patent application Ser. No. 11/056,835 to Shotey et al. (filed Feb. 11, 2005) titled "Weatherproof Receptacle Cover with Adapter Plate," the disclosures of each of which are hereby incorporated herein by reference for their general relevance to the formation and manufacture of cover assemblies. Such assemblies are conventionally made of plastic or metal, may be converted for use with removable portions to adapt the electrical device openings of the base for use with many different types of electrical devices using the same components, and may incorporate spring biased hinge members to enable use in both horizontal and vertical orientations using the same assemblies.

Typical base configurations for electrical devices include, but are not limited to, blank, duplex, decora, ground fault circuit interrupt (GFCI), round and switch. Examples of structures that may be used to enable a base member to be configured for conversion between various other configurations are shown and described in U.S. Pat. Nos. 6,723,922 to Shotey et al. (issued Apr. 20, 2004) titled "Universal cover plate", 6,987,225 to Shotey et al. (issued Jan. 17, 2006) titled "Convertible electrical device cover and method for installing same", 6,441,307 to Shotey et al. (issued Aug. 27, 2002) titled "Universal Cover Plate," and 6,770,816 to Shotey et al. (issued Aug. 3, 2004) titled "Convertible electrical device cover and method for installing same", the relevant disclosures of which are hereby incorporated herein by reference. Alternatively, as suggested in U.S. Pat. No. 6,770,816, the base member may be configured with an opening and attachment members and replaceable adapter plates may be used to enable the installer to select the desired base configuration. These references also include examples of removable cord escape tabs for vertical or horizontal orientations.

The base member may also be configured to cover the socket face of the outlet to which it is attached but allow for plugs to extend through the cover to the electrical outlet. Examples of outlet covers that are configured to cover the socket base are shown and described in U.S. Pat. No. 6,761,582 to Shotey et al. (issued Jul. 13, 2004) titled "Receptacle-mounted cover plate to hide electrical socket face", the disclosure of which is hereby incorporated herein by reference.

SUMMARY

Instead of having a rigid cover depth like conventional in-use outlet covers, implementations of an electrical device cover assembly each include an adjustable depth cover. Adjustability is made possible, in particular implementations, through the use of two or more telescoping sections that extend to one or more in-use positions when it is desired to use the outlet while the cover is closed, and retract to a storage position when there is no need to have the cover closed with a plug inserted.

In one aspect, this document features a telescoping cover assembly for an electrical device that retracts to a relatively shallow depth when not in use and expands to a depth such that the cover may be closed while the device is in use. For example, when the electrical device is an outlet, the cover extends to a depth such that a plug may be plugged into the outlet and the cover may be closed over the plug and the outlet. Various implementations include implementations having an expandable base, implementations having an expandable cover, implementations having indentations on non-adjacent sides of the cover to facilitate grasping the cover, implementations having angled sidewalls, curled interlocking portions and stopper portions that maintain the expanded or collapsed position, implementations having living hinges connecting the telescoping members, implementations for a rectangular base and cover, and implementations for a round base and cover. The base and cover may be formed from plastic, resin, rubber, metal or other conventional material for forming electrical device covers using conventional fabrication methods.

Specifically, each of the electrical device cover assemblies may include a cover and a base. It should be clear from the disclosure herein that although the specific implementations show the base configured for use with a duplex electrical outlet, it may alternatively be configured, directly or through the use of removable tabs or adapter plates, for use with a different electrical device such as, and without limitation, an electrical switch, a GFCI outlet, a round outlet, an electrical cable, multiple electrical devices, and the like. Examples of such convertible adapter plates and bases were previously incorporated by reference. Covers and bases configured according to the implementations disclosed may be formed of metal or non-metal, such as plastic, rubber or resin depending upon the use for the particular cover assembly.

For particular implementations, a cover may include one or more inter-fitting, telescoping base members. The cover may be attached to a base by hinges or other appropriate attaching devices. There may be indented portions on non-adjacent sides of the cover. One or more sidewalls of the inter-fitting telescoping members may include a slanted sidewall, a curled inner portion, a curled outer portion and a stopper portion. The curled inner portion of a larger telescoping member may interlock with the curled outer portion of a smaller telescoping member when the outlet cover is in the expanded position. When the outlet cover is in the retracted position, the curled outer portion of the smaller telescoping member rests against the stopper portion of the larger telescoping member. The outlet cover may include hinges on adjacent sides of both the base and the cover so that the outlet cover can be adapted for either horizontal or vertical use.

For other particular implementations, the telescoping members are connected by a living hinge. A clip may be included to hold the telescoping members in the retracted position.

For other particular implementations, the telescoping members may be round. The round telescoping members may be expanded by twisting in a screw-type motion or by pulling in an accordion-type motion.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and:

FIG. 8 is a front view of a first electrical device cover assembly;

FIG. 9 is a cross-sectional view taken along sectional line C-C in FIG. 8;

DESCRIPTION

This disclosure, its aspects and implementations, are not limited to the specific components or assembly procedures disclosed herein. Many additional components and assembly procedures known in the art consistent with the intended cover assembly and/or assembly procedures for a cover assembly will become apparent for use with implementations of extendable device cover assemblies from this disclosure. Accordingly, for example, although particular hardware is disclosed, such hardware and implementing components may comprise any shape, size, style, type, model, version, measurement, concentration, material, quantity, and/or the like as is known in the art for such hardware and implementing components, consistent with the intended operation of an extendable electrical device cover assembly.

Figure 1:
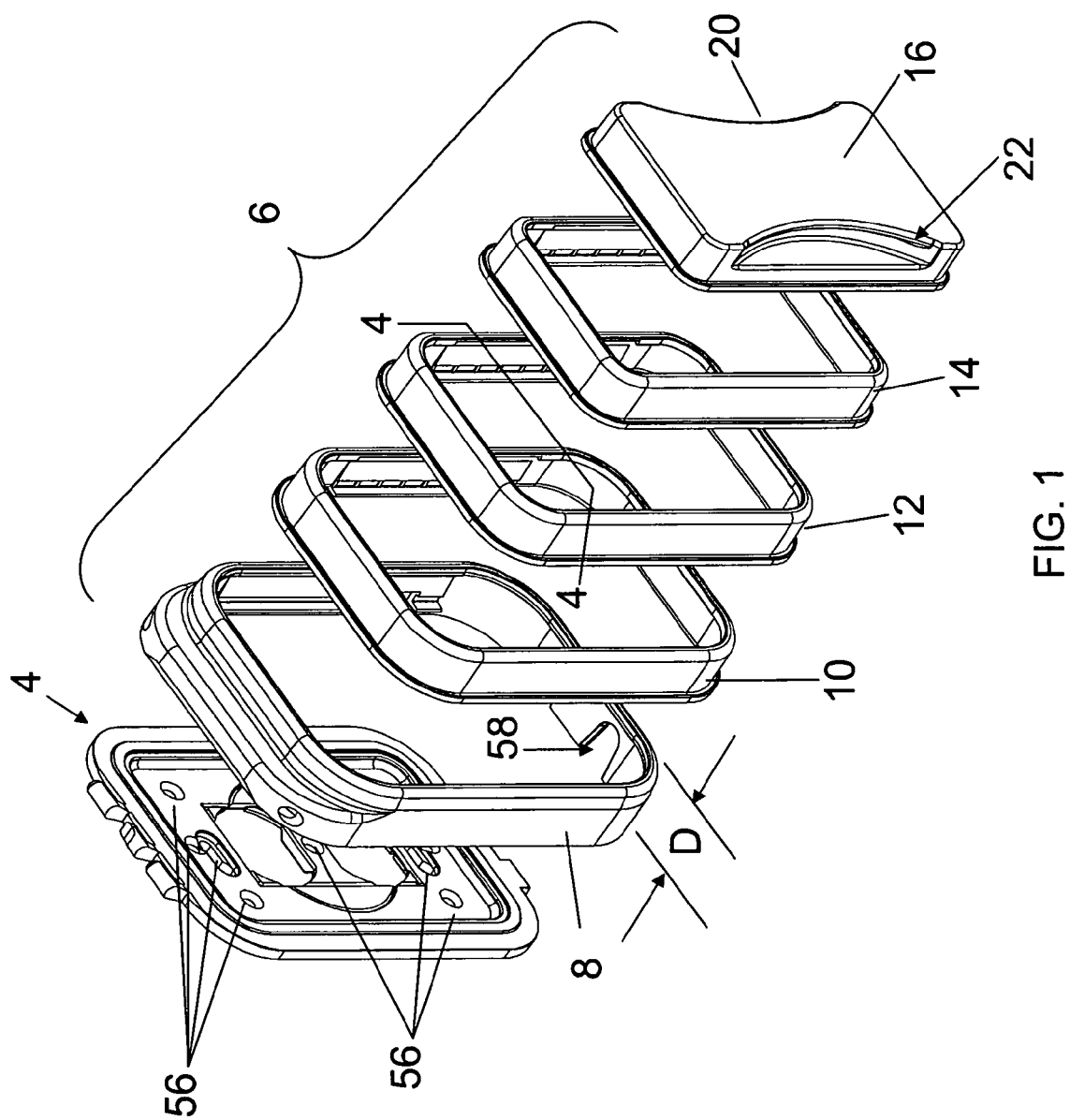
FIG. 1 is a break apart view of a first electrical device cover assembly.

A break-apart view of one implementation of the electrical device cover 2 is shown in FIG. 1. The electrical device cover assembly 2 includes a base 4 and a cover 6. The cover 6 of this particular implementation includes a plurality of telescoping members. Specifically, the cover 6 may include a base telescoping ring 8, a plurality of middle telescoping rings 10, 12 and 14 and a cover telescoping member 16. Each telescoping member has a smaller diameter than the previous telescoping member and the smaller telescoping members 16, 14, 12 and 10 fit within the bigger telescoping members 14, 12, 10 and 8, respectively. Thus, the telescoping members 8, 10, 12, 14 and 16 may nest within each other in the collapsed position (see FIG. 3) and the depth of the collapsed cover 6 is about the same as the depth, D, of the base telescoping ring 8.

The depth of the expanded cover, $D_E$, is at least about two times the depth D of the base telescoping ring 8. The telescoping members 8, 10, 12, 14 and 16 can be configured to have any desired depth and the cover 6 can include any desired number of telescoping members. Therefore, the expanded depth $D_E$ can be about 2 to 5 times deeper than the collapsed depth D.

The base 4 includes mounting screw openings 56 and electrical device openings 52. As explained above, and examples of which were incorporated by reference, the electrical device openings may be configured in many different configurations including, but not limited to, differently shaped openings, openings with removable tabs for adapting the openings to a variety of electrical device shapes and sizes, and/or adapter plates.

The assembly 2 may also include a cord escape 58, as shown in FIG. 1. Alternatively, the assembly may include removable or "knock-out" tabs in the vertical and/or horizontal orientation that, when removed, provide cord openings. Examples of such cord openings and removable tabs were previously incorporated by reference.

Figure 2:
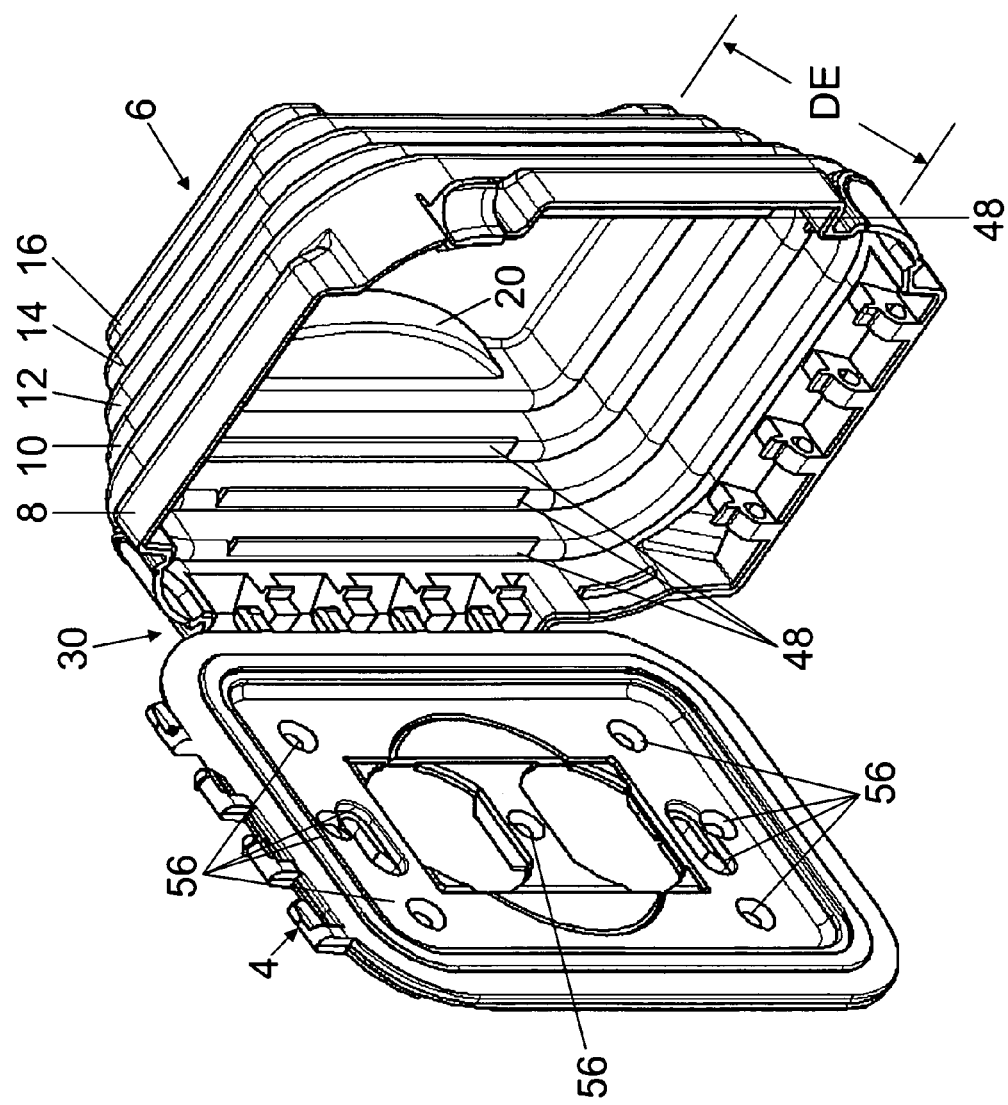
FIG. 2 is a perspective view of a first electrical device cover assembly in an expanded position.

The assembled electrical device cover 2 can be expanded, as shown in FIG. 2, by grasping the indented portions 20 on opposing sides of the cover telescoping member 16 and pulling. The indented portions 20 on the cover telescoping member 16 allow for easy gripping of the extendable cover 6. The indented portions 20 may each include a protruding lip 22, as best shown in FIG. 1. Although the indented portions 20 are shown located on the longer sides of the cover telescoping member 16, the indented portions could alternatively be located on the shorter sides of the cover telescoping member 16. In still other implementations, the indented portions 20 could be eliminated or the cover telescoping member 16 could include only one indented portion or indented portions on adjacent sides. In still yet other implementations, the indented portions could be located on the front surface of the cover member 16 rather than on an edge. Although the indented portions 20 are shown having a curved shape, other shapes, such as rectangular, would also achieve the intended purpose. Other alternative or additional gripping members for facilitating grasping and pulling could be included on the electrical device cover 2.

Figure 3:
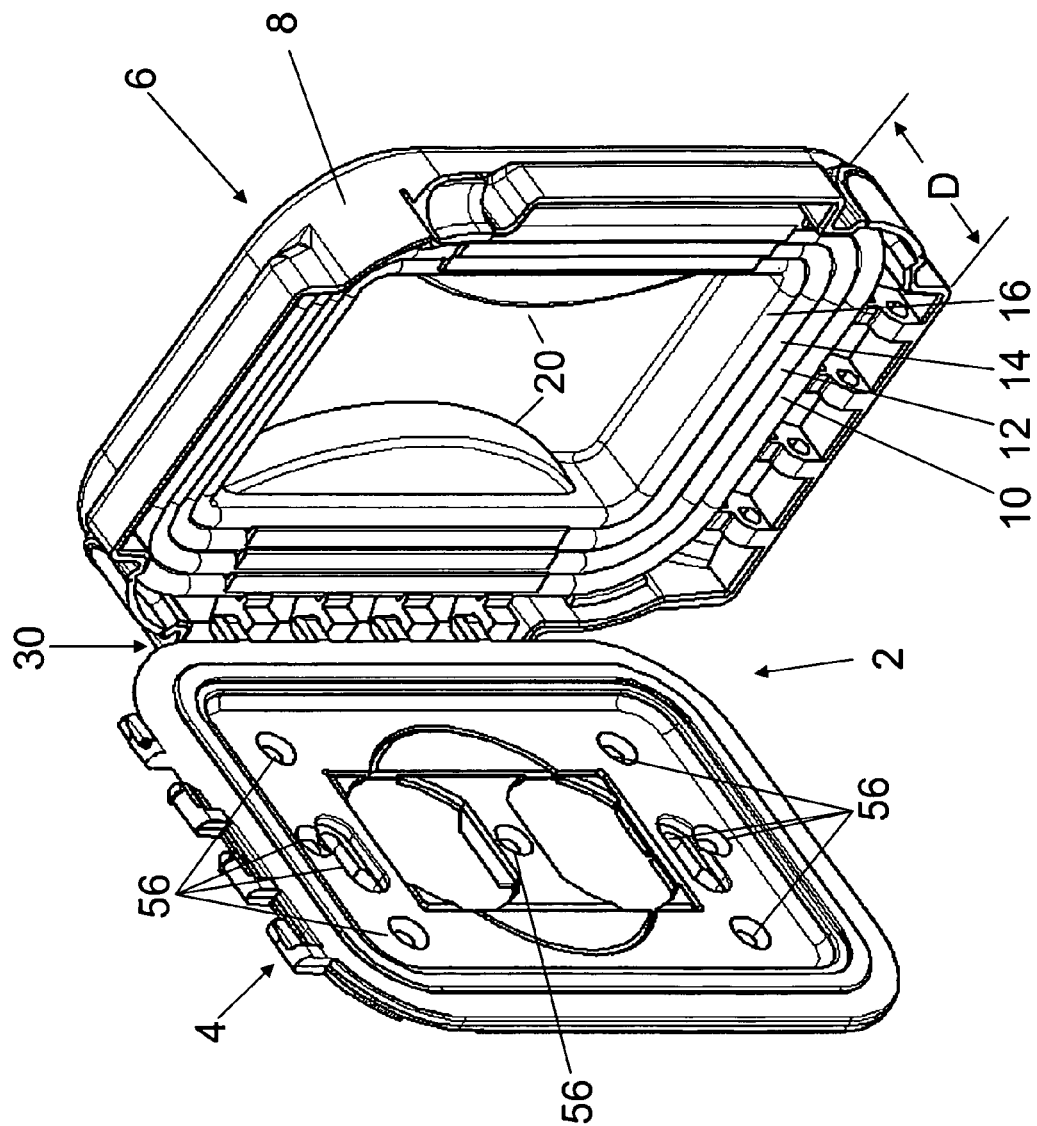
FIG. 3 is a perspective view of a first electrical device cover assembly in a collapsed position.

In the example shown in FIGS. 2 and 3, the cover 6 is attached to the base 4 with hinges 30 disposed on the longer side of the base 4 and the cover 6. The National Electric Code requires that for in-use electrical outlet covers, the lid should close against the base on its own. Generally, this is accomplished through the use of gravity, with the hinge axis of rotation being substantially parallel to, or at least more horizontal than vertical to, the ground when installed. Thus, the example shown in FIGS. 2-3 would be for a horizontal orientation. That is, the hinges 30 would be parallel to the ground. With the hinge axis of rotation parallel to the ground, the lid closes on its own under the force of gravity. Thus, it may be desirable for hinge members to be included on more than one side of the base 4 and cover 6, or even on a corner of the base 4 and cover 6 to enable the cover unit to be mounted and installed either horizontally or vertically using the same cover unit. Examples of such electrical device covers with alternative hinge assemblies were previously incorporated by reference. Such examples of alternative hinge assemblies may be readily incorporated into the present implementations by those of ordinary skill in the art without undue experimentation. In other particular implementations, the hinge assemblies may be replaced by one or more living hinges comprising a flexible material joining the cover 4 and one or more sides of the base 4 or a telescoping ring.

Figure 4:
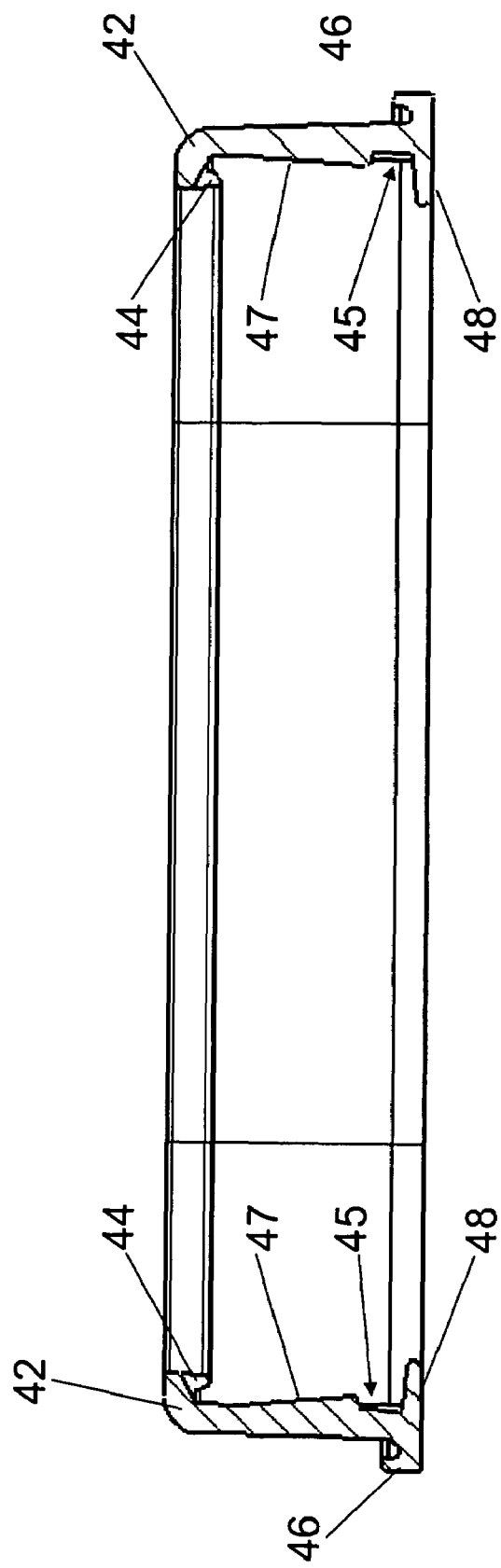
FIG. 4 is a cross sectional view taken along sectional line 4-4 in FIG. 1.

FIG. 4 shows a cross-sectional view of one of the middle telescoping rings taken along line 4-4 in FIG. 1. In this particular implementation, though it is not required in every implementation, the sidewalls 42 of each of the middle telescoping rings 10, 12 and 14 include an inner curled portion 44, an outer curled portion 46, a stopper portion 48, an angled inner sidewall 47 and an inner groove 45. In the collapsed position, the outer curled portion 46 of a smaller middle telescoping ring fits into the inner groove 45 of the adjacent larger telescoping ring and rests against the stopper portion 48 of the larger telescoping ring. For example, the outer curled portion 46 of ring 12 rests against the stopper portion 48 and within the inner groove 45 of ring 10.

When the telescoping cover 6 is expanded, the pressure exerted by gripping and pulling on the cover telescoping member 16 causes the outer curled portion 46 of a smaller middle telescoping ring to pop out of the inner groove 45 of the adjacent larger telescoping ring, slide against the angled sidewall 47 of the larger telescoping ring and interlock with the inner curled portion 44 of the larger telescoping ring. For example, the outer curled portion 46 of telescoping ring 12 pops out of the inner groove 45 of telescoping ring 10, slides against the angled sidewall 47 of telescoping ring 10 and interlocks with the inner curled portion 44 of telescoping ring 10. The interlocking curled portions 46 and 44 and the ramped sidewall 47 provide enough resistance to maintain the cover 6 in the extended position. In order to collapse the cover, pressing on the cover telescoping member 16 provides enough pressure to overcome the resistance and cause the outer curled portion 46 of the smaller middle telescoping ring to slide back along the ramped sidewall 47 of the adjacent larger middle telescoping ring. The outer curled portion 46 of the smaller telescoping ring then comes into contact with the stopper portion 48 of the larger telescoping ring and pops into the inner groove 45 of the larger telescoping ring.

The base telescoping ring 8 may include an inner curled portion 44, an angled sidewall 47, an inner groove 45 and a stopper portion 48, but the outer curled portion 46 is not necessary. Conversely, the cover telescoping member 16 may include an outer curled portion 46, but the inner curled portion 44, angled sidewall 47, inner groove 45 and stopper portion 48 are not necessary.

The inner curled portions 44, the outer curled portions 46, the inner grooves 45, and the angled sidewalls 47 could extend all the way around the telescoping ring members in order to protect the electrical device from the elements. FIG. 8 shows a front plan view of the electrical device cover 2 in the closed position and FIG. 9 is a cross-sectional view along line C-C in FIG. 8. As shown in FIG. 9, the interlocking curled portions of the telescoping ring members enhance the shielding of the electrical device from the elements, such as rain 92.

The stopper portions 48 may extend all the way around the telescoping ring members. Alternatively, the stopper portions 48 may extend along a section of two of the sides of each of the telescoping ring members, as shown in FIG. 2. The stopper portions 48 may alternatively extend along one, three or all four of the sides of each of the telescoping ring members.

A number of modifications may be made to the particular implementation shown in FIGS. 1-4 and described above. For example, the telescoping portions of the cover 6 may be made progressively larger rather than progressively smaller. Yet another modification that is contemplated includes a cover assembly where the base is expandable and the cover is not expandable or where both the base and the cover are partially expandable.

Figure 5:
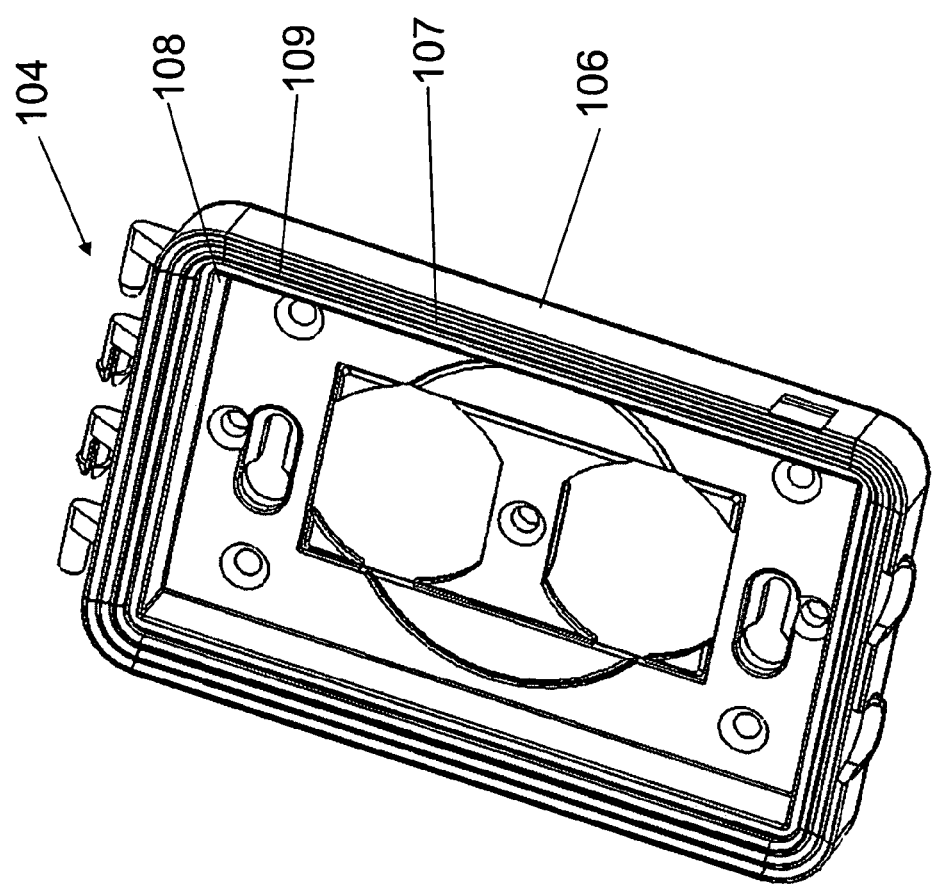
FIG. 5 is a perspective view of a base member of a second electrical device cover assembly in a collapsed position.
Figure 6:
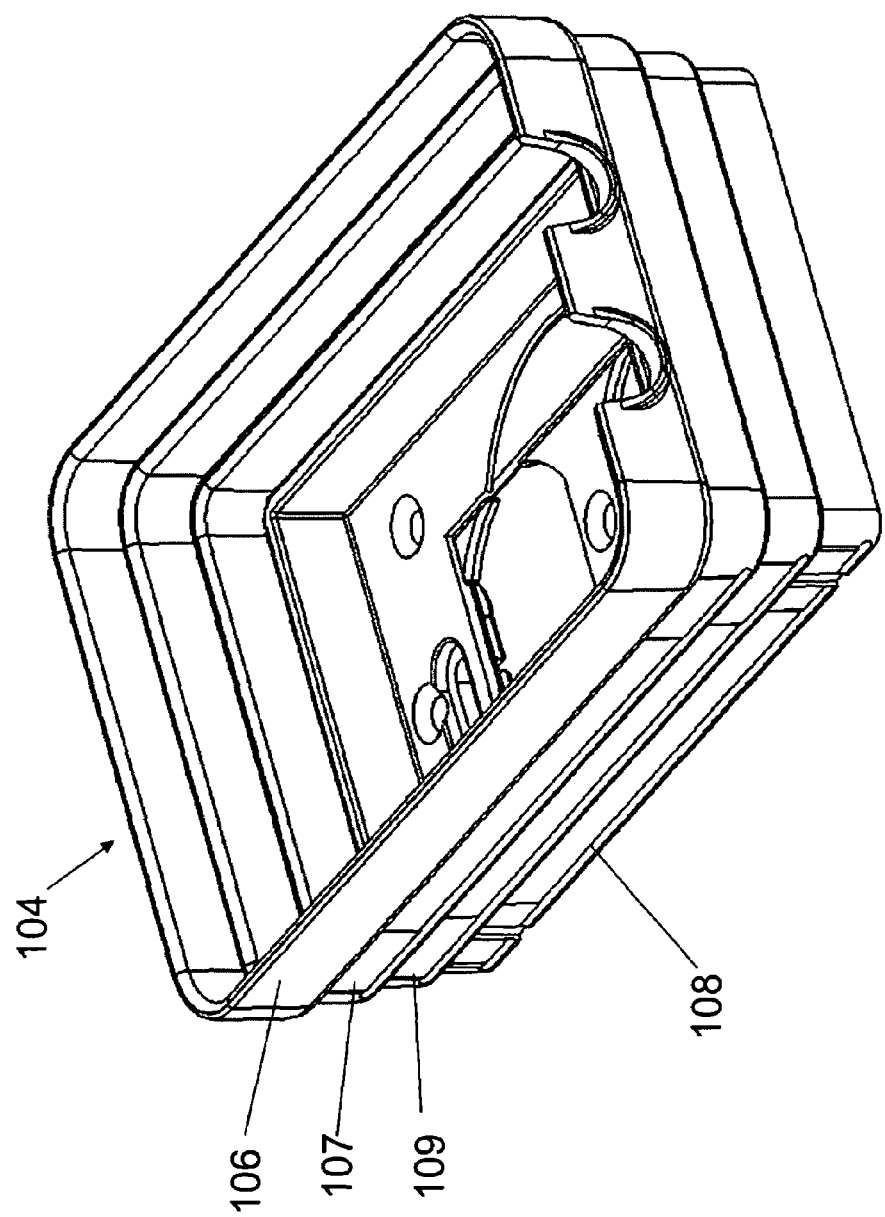
FIG. 6 is a perspective view of a base member of a second electrical device cover assembly in an extended position.
Figure 7:
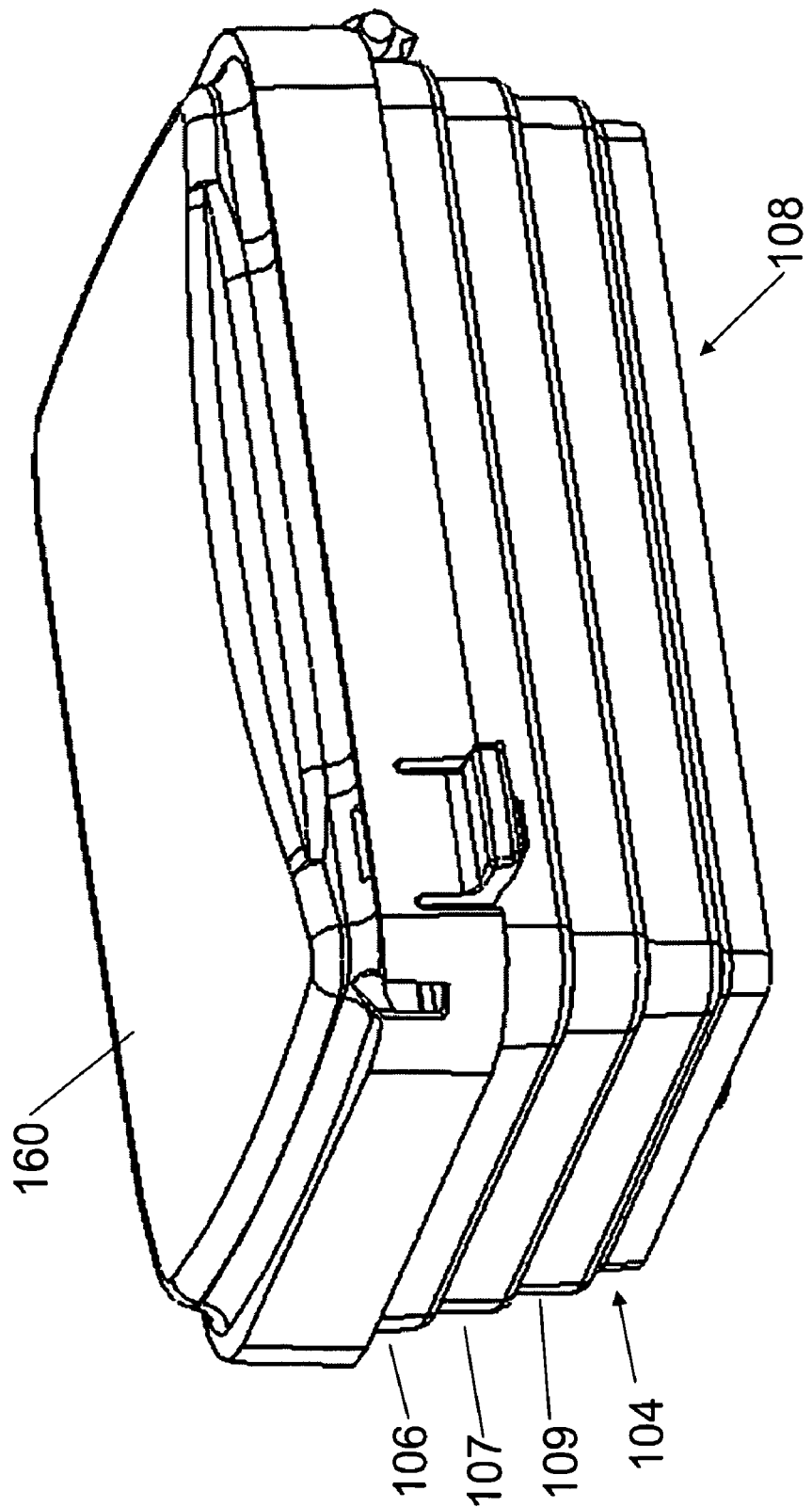
FIG. 7 is a perspective view of a second electrical device cover assembly in an extended position.

An implementation with an expandable base and progressively larger telescoping portions is shown in FIGS. 5-7. The base 104 comprises a base member 108 and a plurality of inter-fitting, telescoping rings 106, 107 and 109. The cover 160 is attached to the outermost telescoping ring 106.

Figure 10:
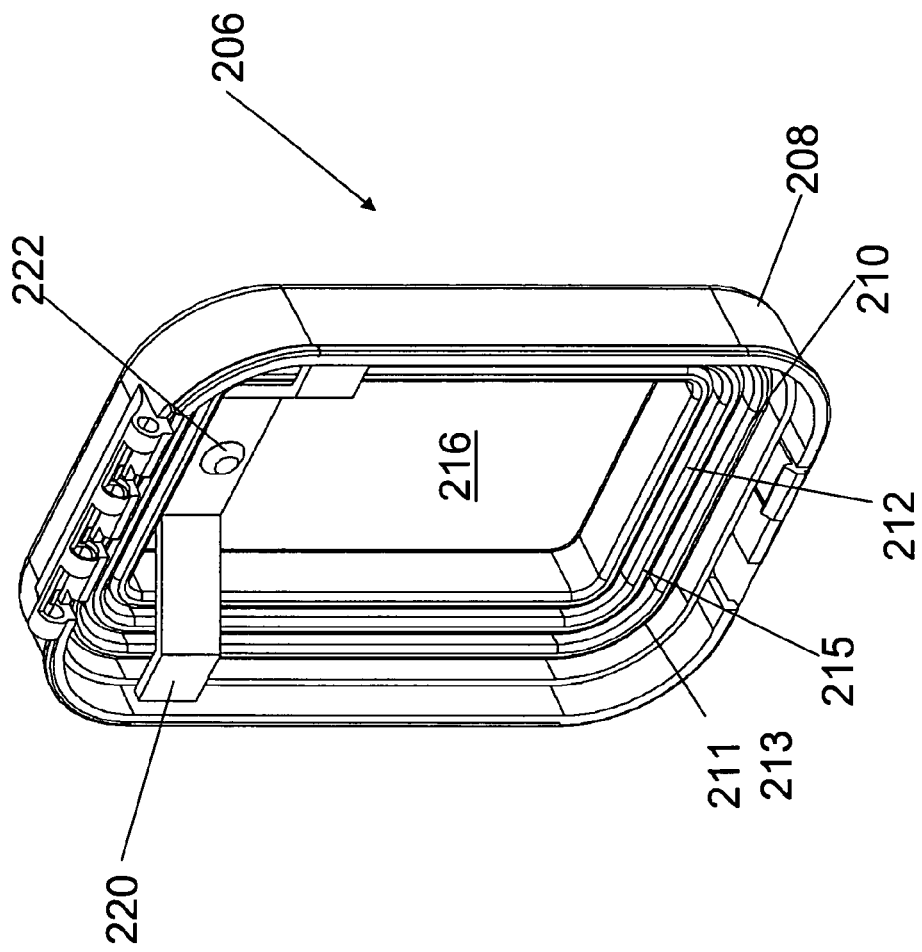
FIG. 10 is a perspective view of a third electrical device cover assembly in a collapsed position.
Figure 11:
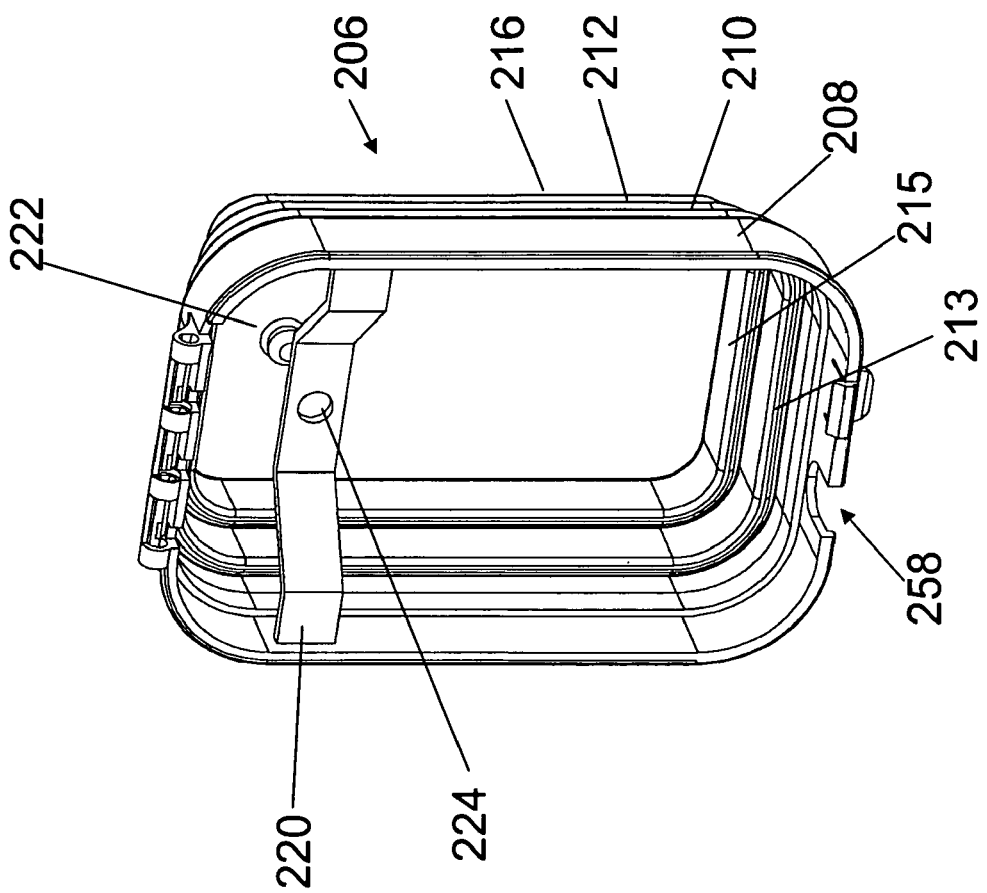
FIG. 11 is a perspective view of a third electrical device cover assembly in an expanded position.
Figure 12:
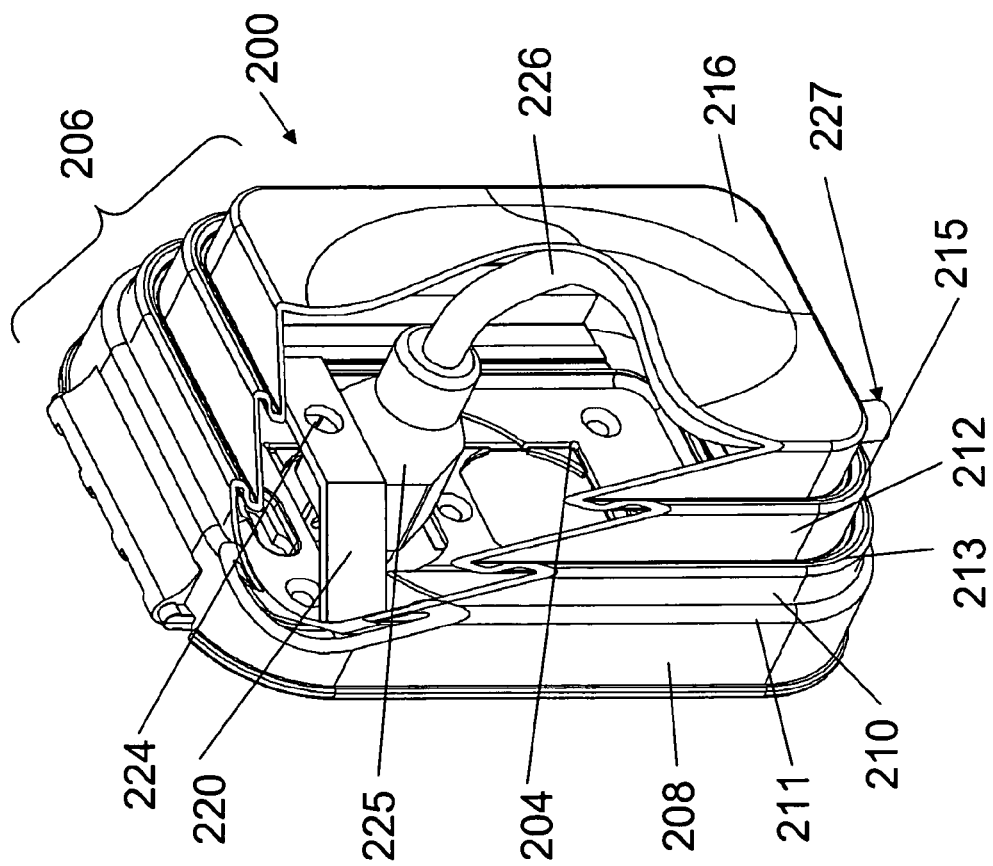
FIG. 12 is a perspective view of a third electrical device cover assembly in use in a closed position.

As an alternative to the interlocking curled portions 44 and 46 of the telescoping ring members 10, 12 and 14, the telescoping members may be joined by a flexible material such as a rubber material. For example, as shown in FIGS. 10-12, the electrical device cover assembly 200 includes a base 204 and a cover 206. The cover 206 of this particular implementation includes a plurality of telescoping members. Specifically, the cover 206 may include a base telescoping ring 208, a plurality of middle telescoping rings 210 and 212 and a cover telescoping member 216. Each telescoping member has a smaller diameter than the previous telescoping member and the smaller telescoping members fit within the bigger telescoping members. Between each telescoping member 208, 210, 212 and 216 is disposed a flexible connector 211, 213 and 215. The flexible connector is a thin, flexible component between the sections that allows for bending. It is contemplated that the flexible connector may be formed of thin plastic, rubber or other appropriate material. Depending upon the material selected to form the flexible connector, the cover 206 may be configured to remain in the extended position by virtue of the nature of the material that comprises the flexible connectors 211, 213 and 215. This would be similar to the way a flexible storage container like the "Collapsable Containers" made by Rubbermaid®, remain erect due to the nature of the plastic material used to form them. One of ordinary skill in the art of plastics molding will understand how to mold an appropriate cover material that can stand erect yet collapse when desired. This particular implementation may also include a clip 220 and a notch 222 to assist the cover in remaining closed if the material selected for the flexible material is not sufficiently rigid. In order to maintain the collapsed position, the notch 222 may be inserted into a hole 224 in the clip 220, as shown in FIG. 10. The partial break-away view of FIG. 12 shows how the plug 225 and the cord 226 can be contained within the device cover 200. The cord exits the cover 200 through a cord opening 227, as previously described relative to another implementation.

In all of the specific examples in FIGS. 1-12 the electrical device covers shown are rectangular. However, any other shape could be used. For example, the electrical device cover could be square, circular or oval. Those of ordinary skill in the art will readily be able to adapt the examples disclosed herein to other shapes.

Figure 13:
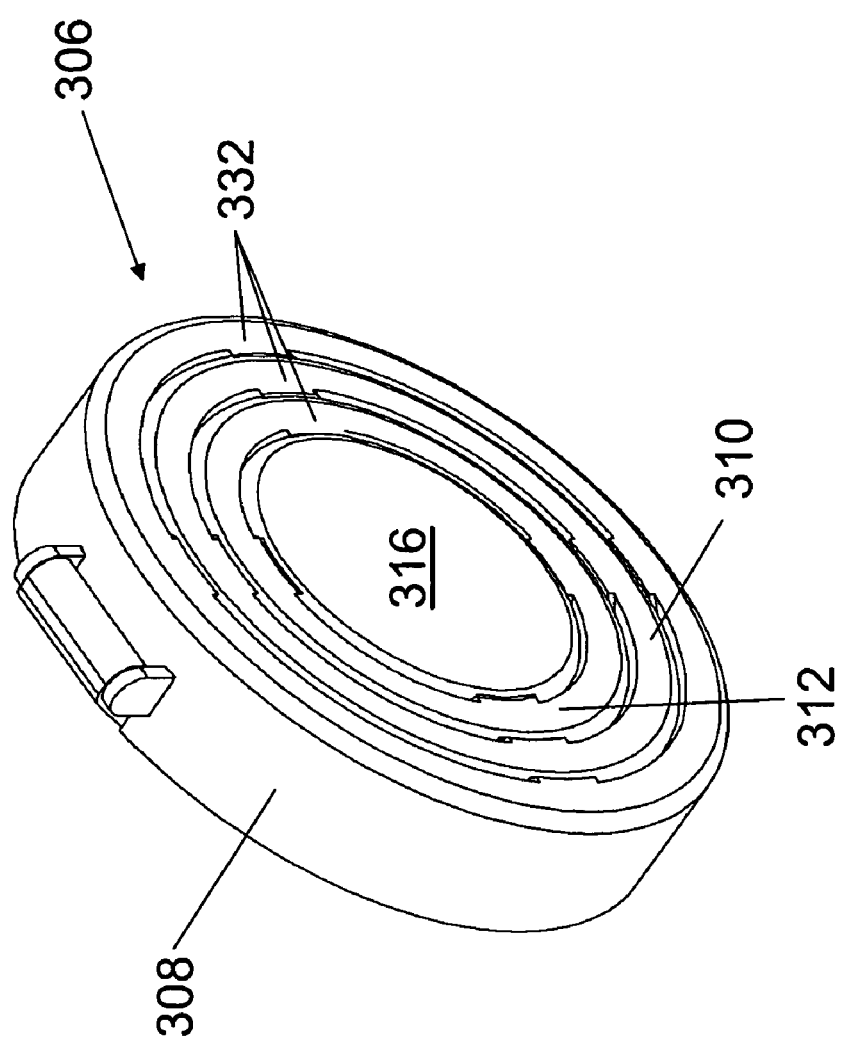
FIG. 13 is a perspective view of a fourth electrical device cover assembly in a collapsed position.
Figure 14:
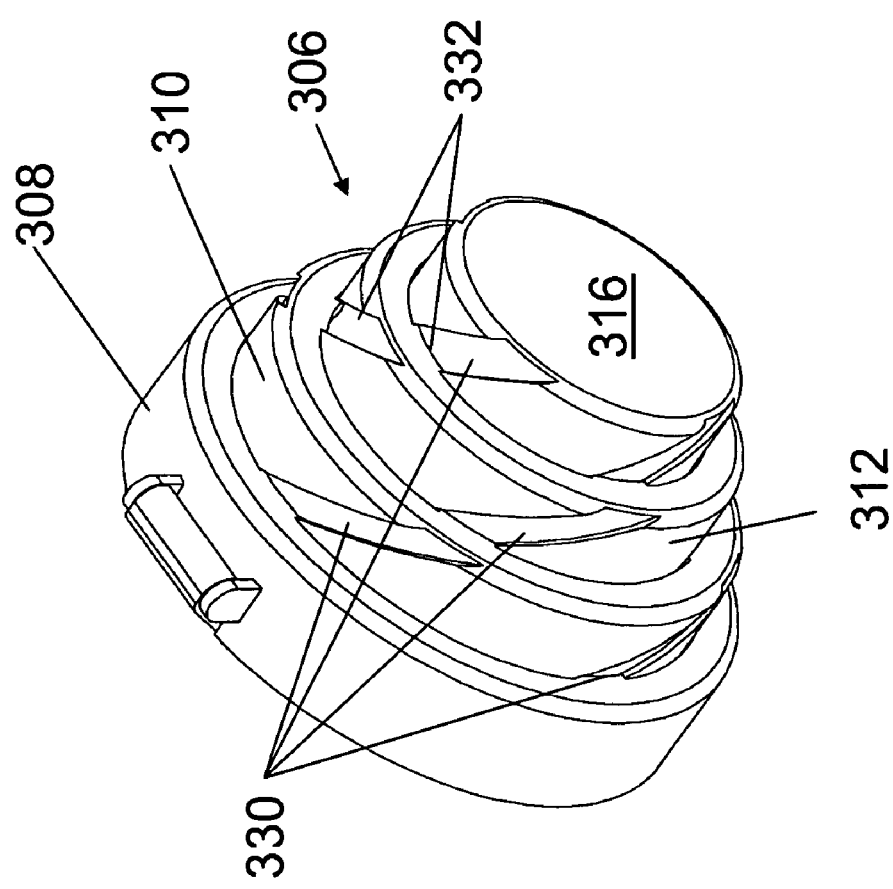
FIG. 14 is a perspective view of a fourth electrical device cover assembly in an extended position.

In yet another implementation, the electrical device cover assembly includes a round base (not shown) and a round cover 306 shown in FIGS. 13-14. The cover 306 may include a plurality of telescoping members. Specifically, the cover 306 may include a base telescoping ring 308, a plurality of middle telescoping rings 310 and 312 and a cover telescoping member 316. Each telescoping member has a smaller diameter than the previous telescoping member and the smaller telescoping members 316, 312 and 310 fit within the bigger telescoping members 312, 310 and 308, respectively. In this implementation, the cover 306 is expanded using a twisting motion. Telescoping members 310, 312 and 316 includes grooves 330 on the outer sidewalls. Telescoping members 308, 310 and 312 include notches 332 on the inner sidewalls. The notches 332 on telescoping members 308, 310 and 312 fit within the grooves 330 on the telescoping members 310, 312 and 316, respectively. The twisting motion allows the notches 332 to travel along the grooves 330, thus expanding the cover 306.

In yet another implementation, the telescoping members are roughly the same size and formed of a flexible material, such as rubber or thin plastic. The telescoping members are essentially stacked on top of each other in the collapsed position. In order to maintain the collapsed position, a clip, such as the clip 220 shown in FIGS. 10-12 could be used.

It will be understood that implementations are not limited to the specific components disclosed herein, as virtually any components consistent with the intended operation of a method and/or system implementation for an electrical outlet cover may be utilized. Accordingly, for example, although particular shapes and sizes of electrical outlet cover assembly components may be disclosed, such components may comprise any shape, size, style, type, model, version, class, grade, measurement, concentration, material, weight, quantity, and/or the like consistent with the intended operation of a method and/or system implementation for an electrical outlet cover may be used.

In places where the description above refers to particular implementations of electrical device cover assemblies, it should be readily apparent that a number of modifications may be made without departing from the spirit thereof and that these implementations may be applied to other cover assembly types. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An expandable electrical outlet cover assembly comprising:
   a base configured for attachment to an electrical outlet box; and
   a cover hingedly coupled to the base through at least one telescoping ring slidably positioned between the base and the cover such that the cover assembly is slidably expandable from a collapsed first depth to an expanded second depth larger than the first depth;
   wherein the cover assembly is configured to maintain itself at its expanded second depth through interference of the at least one telescoping ring with a ramp on a sidewall of the base or a second telescoping ring.

2. The cover assembly of claim 1, wherein the ramp is configured to expand the cover assembly towards the expanded second depth.

3. The cover assembly of claim 1, wherein the ramp is configured to oppose compression of the cover assembly to the collapsed first depth.

4. The cover assembly of claim 1, wherein the base is slidably coupled to the at least one telescoping ring and the cover is hingedly coupled to the at least one telescoping ring.

5. The cover assembly of claim 1, wherein the cover is slidably coupled to the at least one telescoping ring and the base is hingedly coupled to the at least one telescoping ring.

6. The cover assembly of claim 1, wherein the cover and the base are round.

7. The cover assembly of claim 6, wherein the cover assembly expands from the first depth to the second depth by twisting.

8. The cover assembly of claim 1, wherein the second depth is at least twice as deep as the first depth.

9. The cover assembly of claim 1, wherein the at least one telescoping ring comprises at least two telescoping rings.

10. An expandable electrical outlet cover assembly comprising:
    a cover hingedly coupled to a base through a telescoping ring such that the cover assembly is expandable between a first collapsed position and a second expanded position, wherein in the second expanded position the cover and base are farther apart from each other than in the collapsed position;
    wherein the cover assembly comprises a ramp on a sidewall configured to engage the at least one telescoping ring when the cover assembly is moved to its second expanded position and oppose compression of the device cover from the second expanded position to the first collapsed position.

11. The cover assembly of claim 10, wherein the ramp is configured to expand the cover assembly towards the second expanded position.

12. The cover assembly of claim 10, wherein the base is slidably coupled to the at least one telescoping ring and the cover is hingedly coupled to the at least one telescoping ring.

13. The cover assembly of claim 10, wherein the cover is slidably coupled to the at least one telescoping ring and the base is hingedly coupled to the at least one telescoping ring.

14. The cover assembly of claim 10, wherein the cover and the base are round.

15. The cover assembly of claim 14, wherein the cover assembly expands from the first collapsed depth to the second expanded depth by twisting.

16. The cover assembly of claim 10, wherein the second depth is at least twice as deep as the first depth.

17. The cover assembly of claim 10, wherein the at least one telescoping ring comprises at least two telescoping rings.

18. The cover assembly of claim 10, wherein the sidewall is a sidewall of the telescoping ring and the ramp is on an inner surface of the sidewall of the telescoping ring.

19. The cover assembly of claim 18, wherein the sidewall further comprising a groove on the inner surface bounded by the ramp and an inwardly extending stop, wherein by engagement of the at least one telescoping ring in the second expanded position through the ramp, compression of the device cover is opposed.

20. An expandable electrical outlet cover assembly comprising:
- a base configured for attachment to an electrical outlet box; and
- a cover hingedly coupled to the base through at least one telescoping ring slidably positioned between the base and the cover such that the cover assembly is slidably expandable from a collapsed first depth to an expanded second depth larger than the first depth;
- wherein the at least one telescoping ring comprises a lower edge that slides along an angled sidewall of the base or a second of the at least one telescoping ring; and
- wherein the cover assembly is configured to maintain itself at its expanded second depth through interference of the at least one telescoping ring with the angled sidewall.

* * * * *